(12) United States Patent
Goh et al.

(10) Patent No.: US 6,629,290 B1
(45) Date of Patent: Sep. 30, 2003

(54) METHOD AND APPARATUS FOR AUTOMATIC TRANSMIT VERIFICATION

(75) Inventors: Joon Kit Goh, Singapore (SG); Boon Piaw Tan, Singapore (SG); L. S. Chua, Geylang Bahru (SG)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/531,519

(22) Filed: Mar. 21, 2000

Related U.S. Application Data

(60) Provisional application No. 60/173,482, filed on Dec. 29, 1999.

(51) Int. Cl.[7] .............. G06F 7/02; H04L 1/00
(52) U.S. Cl. ..................... 714/819; 714/799
(58) Field of Search ............... 714/819, 821, 714/799, 712, 715, 4

(56) References Cited

U.S. PATENT DOCUMENTS 5,307,459 A * 4/1994 Petersen et al.
5,319,752 A * 6/1994 Petersen et al.
5,751,951 A * 5/1998 Osborne et al.
5,802,105 A * 9/1998 Tiedemann, Jr. et al. ... 375/225
6,330,428 B1 * 12/2001 Lewis et al.

* cited by examiner

Primary Examiner—Phung M. Chung

(57) ABSTRACT

A method and apparatus for automatically verifying whether a network interface is transmitting frame data properly. Frame data stored in host memory is transmitted to the network interface and to a transmit data checker. The network interface receives, processes and transmits the frame data. The processed frame data is transmitted to a network media and to the transmit data checker. The transmit data checker compares the frame data from the host memory with the processed frame data from the network interface and generates an indicator signal. The indicator signal indicates whether the network interface is transmitting processed frame data properly. The indicator signal is sent to a display which displays the result. The transmit data checker includes a timer for determining the processing time of the network interface. The timer measures the time between reception of the frame data from the host memory and the reception of the transmitted data.

18 Claims, 6 Drawing Sheets

METHOD AND APPARATUS FOR AUTOMATIC TRANSMIT VERIFICATION

RELATED APPLICATIONS

This application claims priority from U.S. Provisional Application No. 60/173,482, filed Dec. 29, 1999, which is incorporated herein by reference.

TECHNICAL FIELD

The present invention relates to a method and apparatus for automatic transmit verification, and more specifically for automatically determining if a network interface is transmitting data properly.

BACKGROUND ART

After manufacturing a network interface on a chip, the network interface needs to be tested to ensure that the network interface is receiving, processing and transmitting frame data properly. Typically, testing the transmitting aspect of a network interface is accomplished by monitoring the frame data being transmitted from the network interface to a network media such as a network or a network model and comparing the transmitted frame data to a golden file. A golden file is a file containing known results for the transmitted frame data.

Comparing transmitted frame data to a golden file is time consuming and difficult. Often, problems are encountered when the transmitted frame data and the frame data in the golden file are not properly matched or aligned, causing unnecessary errors. In order to ensure accuracy of the testing process, the transmitted frame data must be compared to the proper frame data in the golden file. Often, this comparison requires an experienced Ethernet user who knows Ethernet protocol and can properly align the transmitted frame data and the frame data in the golden file for testing.

Using golden files for data transmission testing is also very limited and inflexible because only known frame data can be tested. In other words, the network interface can only test and verify transmit frame data in which there is a golden file. As a result, testing is limited to the test parameters of the golden files. Any variance in the size of the frames, order of the frames, type of data, etc. from the known test parameters in the golden file produces errors. Therefore, testing is driven by the parameters of the golden files.

SUMMARY OF THE INVENTION

There is a need for an automatic transmit data checker system which can automatically verify whether a network interface is transmitting frame data properly and efficiently.

There is also a need for an automatic data checker system which is flexible and allows for testing of unknown frame data, i.e., frame data that is not limited to frame data having a golden file. There is also a need for an automatic transmit data checker system to provide an indication when a network interface is not transmitting data properly. There is also a need for an automatic transmit data checker system which can automatically determine the processing time of a network interface.

These and other needs are attained by the present invention, where an automatic transmit data checker system is able to automatically and efficiently determine if a network interface is transmitting data properly.

According to one aspect of the present invention, an automatic transmit data checker system comprises host memory, a network interface and a transmit data checker for verifying whether a network interface is transmitting frame data properly. Frame data in the host memory is transmitted to the network interface and the transmit data checker. This frame data is then compared by the transmit data checker to the frame data transmitted by the network interface to determine if the network interface is transmitting frame data properly. The result of this comparison is then displayed on a display device. The automatic transmit data checker system is flexible since the transmit data checker is able to compare unknown frame data stored in the host memory. The automatic transmit data checker is not limited to testing frame data having a golden file.

Another aspect of the present invention is that the automatic transmit data checker system can determine the processing time of the interface chip. This is accomplished by the transmit data checker starting a timer in response to receiving the frame data from the host memory and stopping the timer in response to receiving the frame data from the network interface. The processing time of the network interface is then displayed on the display device. Knowing the processing time of the network interface allows network interface manufacturers to determine if an interface chip is performing in accordance with the performance specifications for the given network interface.

Another aspect of the present invention provides a method for determining if a network interface is transmitting frame data properly. The method comprises the steps of: transmitting frame data from host memory to a network interface and to a transmit data checker; receiving, processing and transmitting the frame data to the transmit data checker; comparing the frame data from the host memory and the transmitted frame data from the network interface; generating an indicator signal indicating whether the network interface is transmitting frame data properly; and displaying the result of the comparison in response to receiving the indicator signal. This method allows for automatic and efficient testing of a network interface.

Another aspect of the present invention provides a method for determining the processing time of the network interface. The method comprises the steps of: starting a timer in response to receiving frame data from host memory. Stopping the timer in response to receiving the transmitted frame data from the network interface. Generating and transmitting a processing time signal in response to stopping the timer due to receiving the transmitted frame data from the network interface. Displaying the processing time on a display device in response to receiving the processing time signal. Displaying the processing time of the network interface allows for a quick determination whether the network interface is operating according to the performance specifications for the given network interface.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention is described in the context of an IEEE 802.3 compliant network interface configured for sending and receiving data packets between a system memory and a network medium using established Media Access Control (MAC) and Physical Layer (PHY) protocols. An overview will first be provided of the network interface, followed by a description of the arrangement for automatically determining if a network interface is transmitting data properly.

Network Interface Overview

Figure 1A:
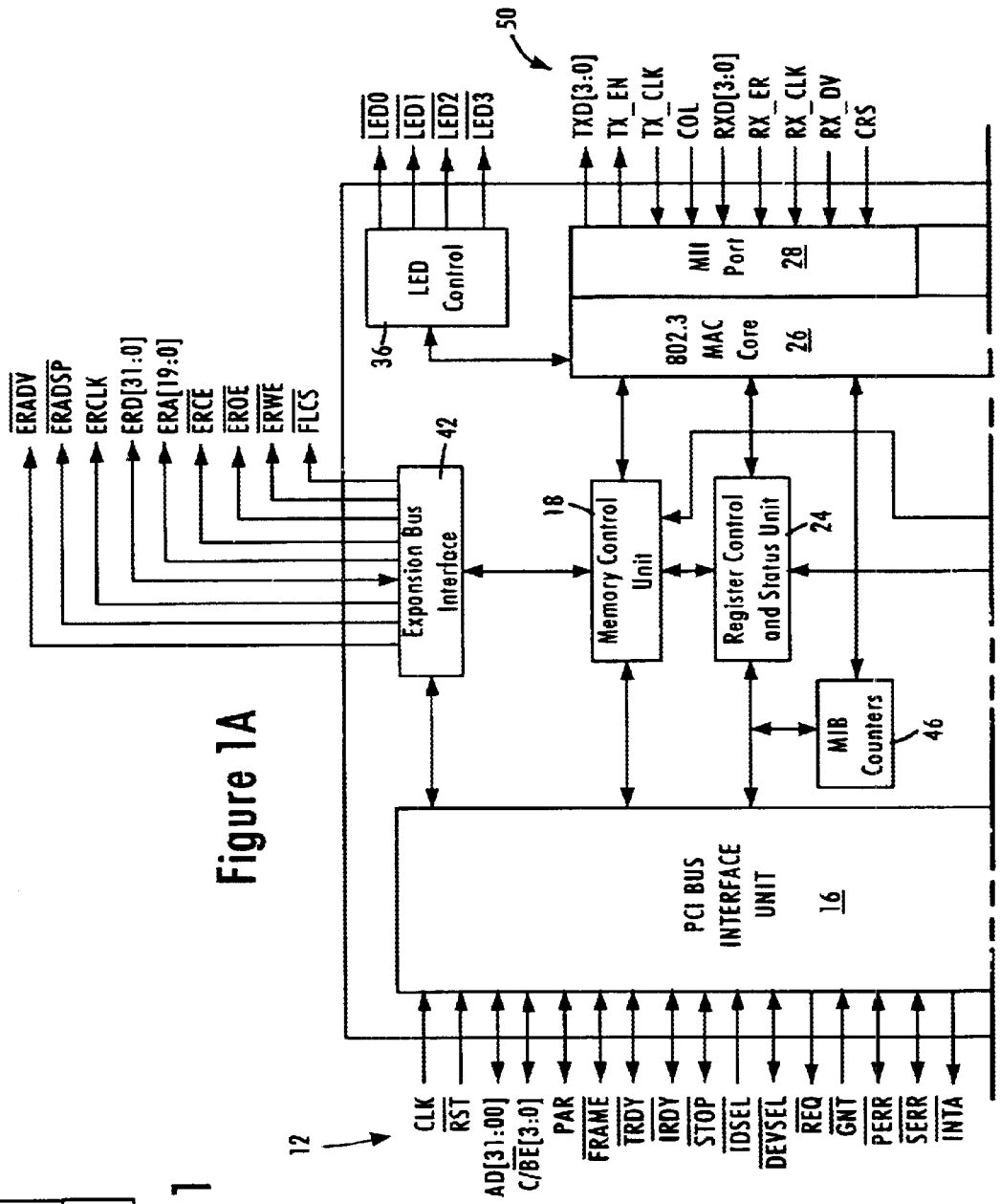
FIG. 1 is a block diagram of an exemplary network interface that accesses the media of an Ethernet network according to an embodiment of the present invention.
Figure 1B:
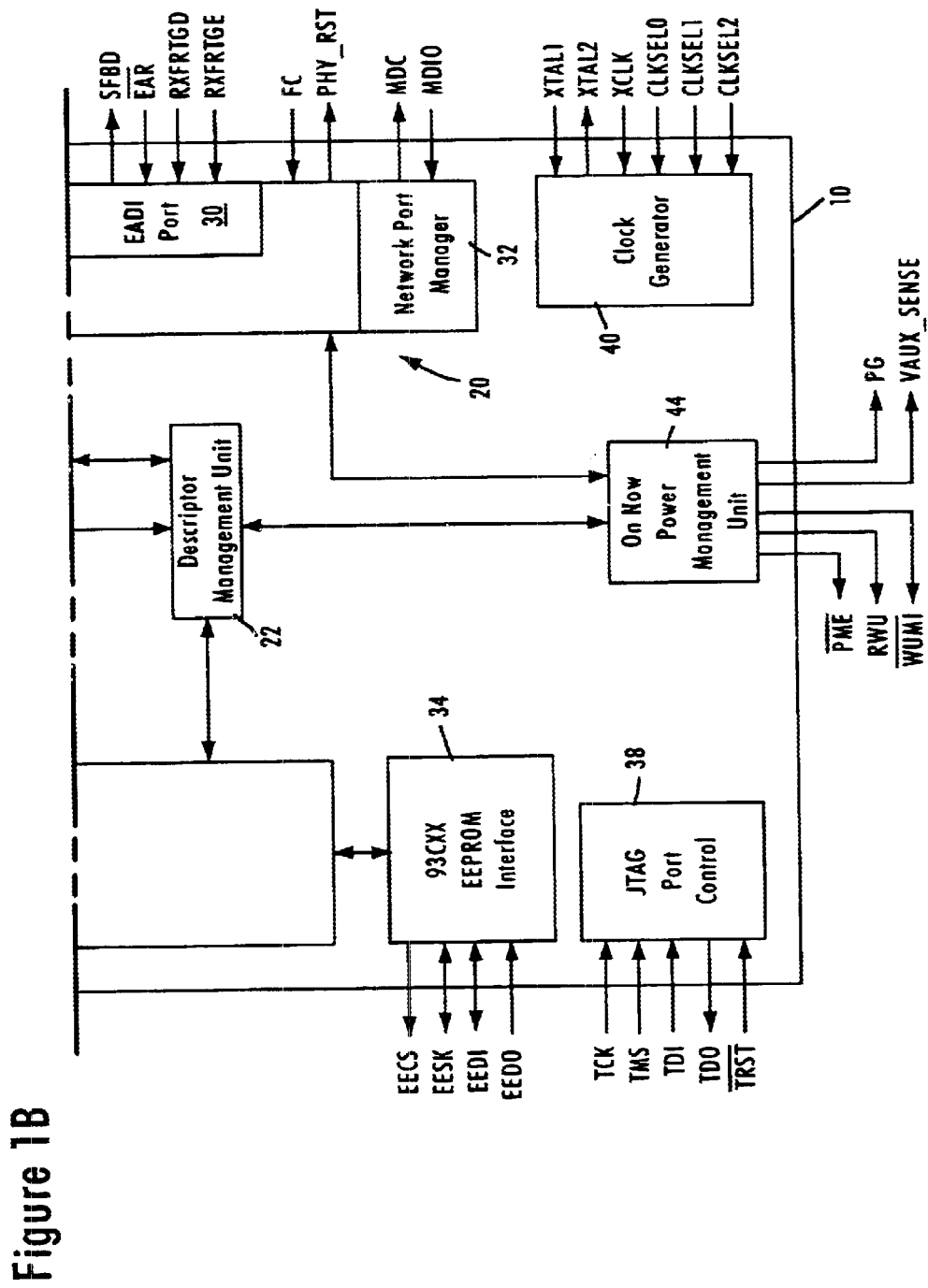

FIG. 1 is a block diagram of an exemplary network interface 10 that accesses the media of an Ethernet network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. The reference numeral 50 identifies either an actual network medium, or alternately a signal path (e.g., a media independent interface (MII)) to a physical layer transceiver coupled to the network media.

The network interface 10 includes a PCI bus interface unit 16, a memory control unit 18, a network interface portion 20, a descriptor management unit 22 and a register control and status unit 24. The network interface portion 20 includes an IEEE 802.3 compliant and full-duplex capable media access control (MAC) core 26, a Media Independent Interface (MII) port 28 for connecting external 10 Mb/s, 100 Mb/s or 1000 Mb/s transceivers, an External Address Detection Interface (EADI) port 30, and a network port manager unit 32. The network interface 10 also includes an EEPROM interface 34 for reading from and writing to an external EEPROM, an LED control 36, an IEEE 1149.1-compliant JTAG Boundary Scan test access port interface 38, a clock generation unit 40, and an expansion bus interface 42. The expansion bus interface unit 42 interfaces to an external or internal data memory (not shown in FIG. 1) for frame storage and also to non-volatile (e.g., EPROM or Flash memory) storage for boot ROM use during startup.

The PCI bus interface unit 16, compliant with the PCI local bus specification (revision 2.2), receives data frames from a host computer memory via the PCI bus 12. The PCI bus interface unit 16, under the control of the descriptor management unit 22, receives transfers from the host computer via the PCI bus 12. For example, transmit data received from the PCI bus interface unit 16 is passed to the memory control unit 18 which stores it in the data memory. Subsequently, the memory control unit 18 retrieves the transmit data from the data memory and passes it to the MAC 26 for eventual transmission to the network. Similarly, receive data from the network 50 is processed by the MAC 26 and passed to the memory control unit 18 for storage in the data memory. Subsequently, the memory control unit 18 retrieves the receive data from the data memory and passes it to the PCI bus interface unit 16 for transfer to the host computer via the PCI bus 12.

The descriptor management unit 22 manages the transfers of data to and from the host computer via the PCI bus interface unit 16. Data structures contained in the memory of the host computer specify the size and location of data buffers along with various control and status information. The descriptor management unit 22 interfaces with the memory control unit 18 to insert control information into the transmit data stream and to retrieve status information from the receive data stream.

The network interface portion 20 includes a network port manager 32 that performs auto-negotiation functions by communicating via the media 50 with a corresponding auto-negotiation unit in the link partner (e.g., a centralized hub, repeater, workstation, or switch).

The network interface 10 also includes a power management unit 44 that enables remote activation (i.e., turn-on) of the host computer via the network medium 50 by detecting a predetermined pattern on the network medium 50 according to Microsoft OnNow and ACPI specifications, including compliance with Magic Packet technology and PCI Bus Power Management Interface Specification protocols.

The network interface 10 also includes a MIB counter unit 46 which accepts information from the MAC 26 regarding frame transmission and reception and maintains the statistics necessary for network management. These statistics are accessed by the host computer via the PCI bus interface unit 16.

Figure 2:
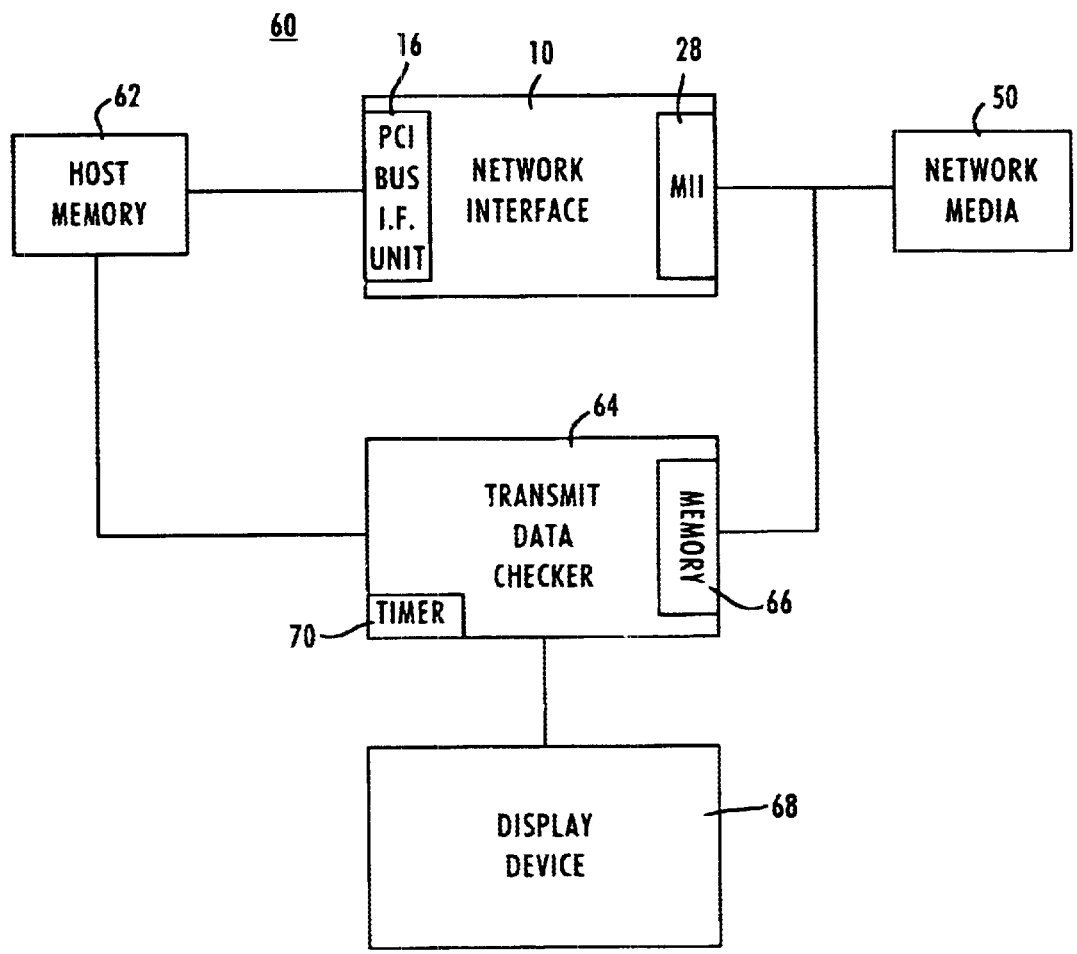
FIG. 2 is a block diagram illustrating an exemplary arrangement of a transmit data checker system.

FIG. 2 is a block diagram illustrating an exemplary arrangement of a transmit data checker system in accordance with the present invention. The transmit data checker system 60 comprises host memory 62, a network interface 10, and a transmit data checker 64. The host memory 62 contains frame data for transmission by the network interface 10. The network interface 10 receives, stores and transmits the frame data via the media independent interface (MII) port 28. The frame data is transmitted to a network media 50. As used herein, the term frame data is defined as frame data and the operation information associated with the frame data. The operation information includes descriptors and other information necessary to be make the frame data IEEE 802.3 compliant. For testing purposes, the network media 50 is either an Ethernet network or a model network. The frame data is also provided to the transmit data checker 64 from the host memory 62 and the network interface 10.

In certain embodiments, the transmit data checker 64 stores the frame data transmitted frame data from the network interface in transmit data checker memory 66. When the network interface 10 is transmitting the frame data, TX_EN of the MII port 28 (See FIG. 1) is asserted. While TX_EN is asserted, the transmit data checker memory 66 is updated with the transmitted data through ports (TXD[3:0], TX_EN, TX_CLK, TX_ER) of Ethernet controller. The de-assertion of TX EN signifies the end of the transmission.

The transmit data checker 64 automatically compares the frame data from the host memory (e.g., master memory) 62 and either the frame data from the network interface 10 or the frame data from the network interface 10 which is stored in the transmit data checker memory (e.g., slave memory) 66.

The comparison determines if the network interface 10 is transmitting the processed frame data from the host memory 62 properly. Based on the comparison, the transmit data checker 64 generates an indicator signal which indicates whether the network interface 10 is transmitting frame data properly. A display device 68 displays the result of the comparison in response to receiving the indicator signal. Typically, the result of the comparison is either a pass or fail type of indication.

Therefore, the transmit data checker 64 compares frame data provided by the network interface 10 to the frame data stored in host memory 62, e.g., the same frame data prior to transmission. This comparison determines if the network interface 10 is transmitting the frame data properly without having to use a golden file for the comparison. Since the present invention does not use a golden file, the transmit data checker is limited to testing only with frame data having a golden file.

In certain embodiments of the present invention, the transmit data checker 64 includes a timer 70 for measuring the time difference between receiving the frame data from the host memory 62 and receiving the frame data from the network interface 10. This time difference indicates the processing time of the network interface 10. The transmit data checker 64 determines the processing time and generates a processing time signal which is displayed on the display 68.

Figure 3:
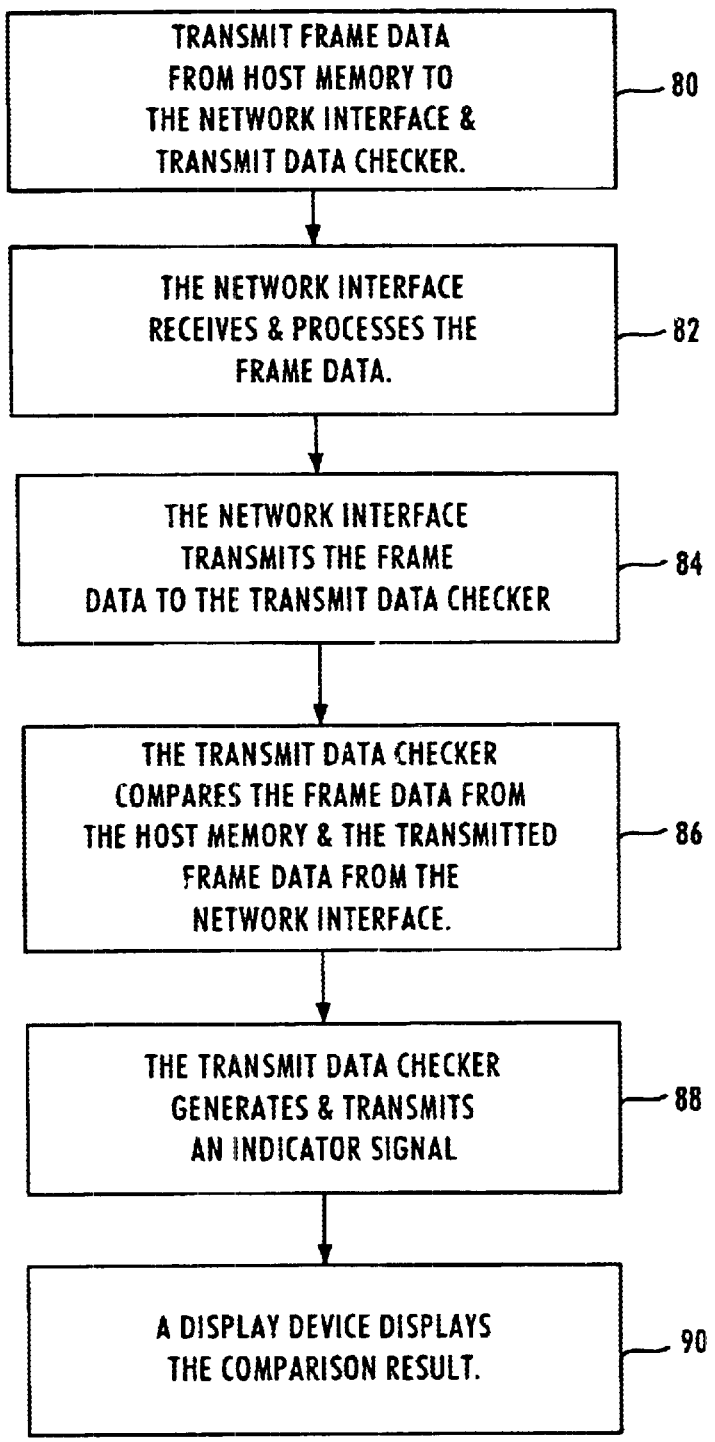
FIG. 3 is a flow chart of a method for determining whether a network interface is transmitting data properly.

FIG. 3 is a flow chart of a method for determining whether a network interface is transmitting data properly. The method starts with frame data being transmitted from host memory 62 to a network interface 10 and a transmit data checker 64 at step 80. The network interface 10 receives and processes the frame data at step 82. The network interface 10 transmits the frame data to the transmit data checker 64 at step 84. In the preferred embodiment, the frame data is also transmitted to a network media 50, such as an Ethernet network or a model network. The transmit data checker 64 compares the frame data from the host memory 62 and the transmitted frame data from the network interface 10 at step 86. The transmit data checker 64 generates an indicator signal indicating whether the network interface 10 is transmitting frame data properly at step 88. A display device 68 displays the comparison result in response to receiving the indicator signal at step 90.

Figure 4:
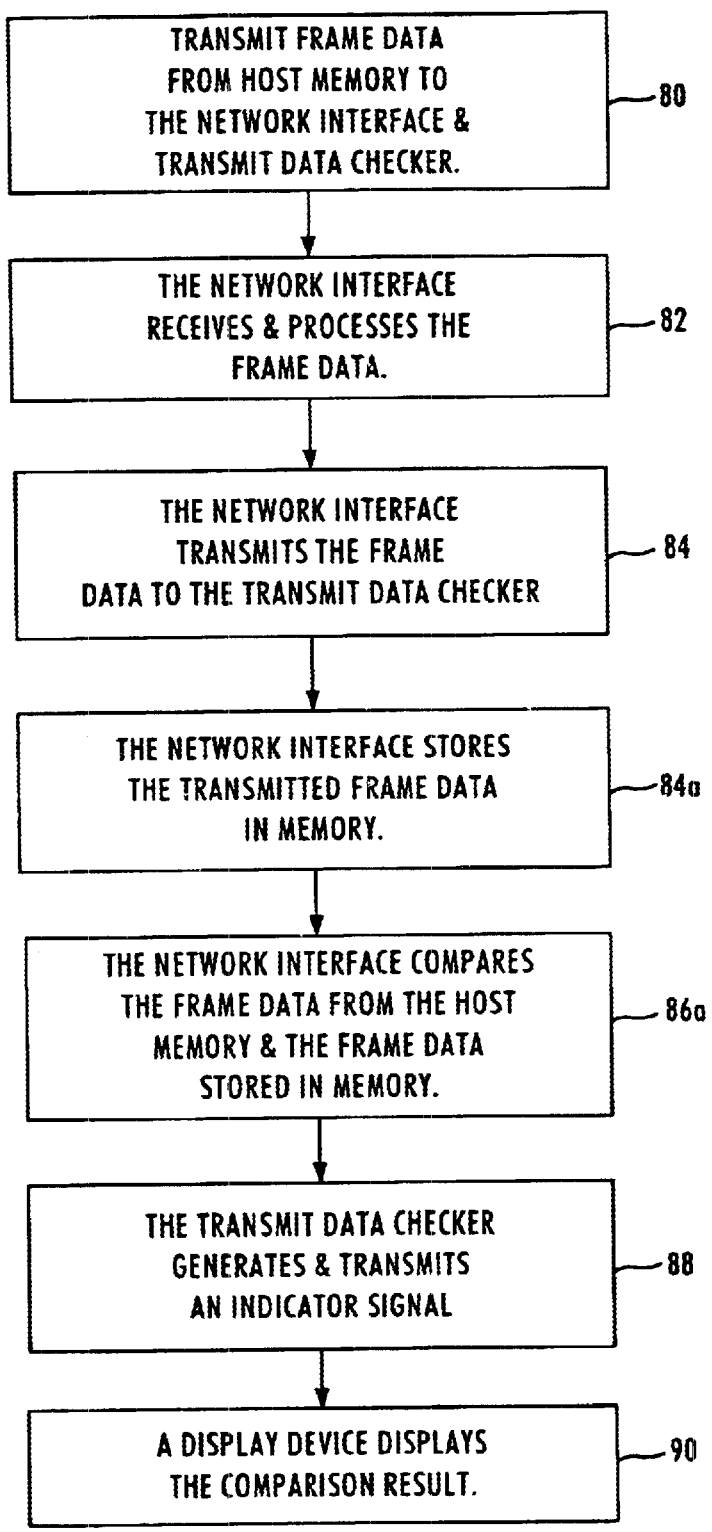
FIG. 4 is a flow chart of an alternate method for determining whether a network interface is transmitting data properly.

FIG. 4 is a flow chart of an alternate method for determining whether a network interface is transmitting data properly. The method starts with frame data being transmitted from host memory 62 to a network interface 10 and a transmit data checker 64 at step 80. The network interface 10 receives and processes the frame data at step 82. The network interface 10 provides the processed frame data to the transmit data checker 64 at step 84. In the preferred embodiment, the processed frame data is transmitted to a network media 50, such as an Ethernet network or a model network. The processed frame data from the network interface is stored in memory 66 in the transmit data checker 64 at step 84*a*. The transmit data checker 64 compares the frame data from the host memory 62 and the stored frame data in memory 66 in the transmit data checker 64 at step 86*a*. The transmit data checker 64 generates an indicator signal indicating whether the network interface 10 is transmitting processed frame data properly at step 88. A display device 68 displays the comparison result in response to receiving the indicator signal at step 90.

Figure 5:
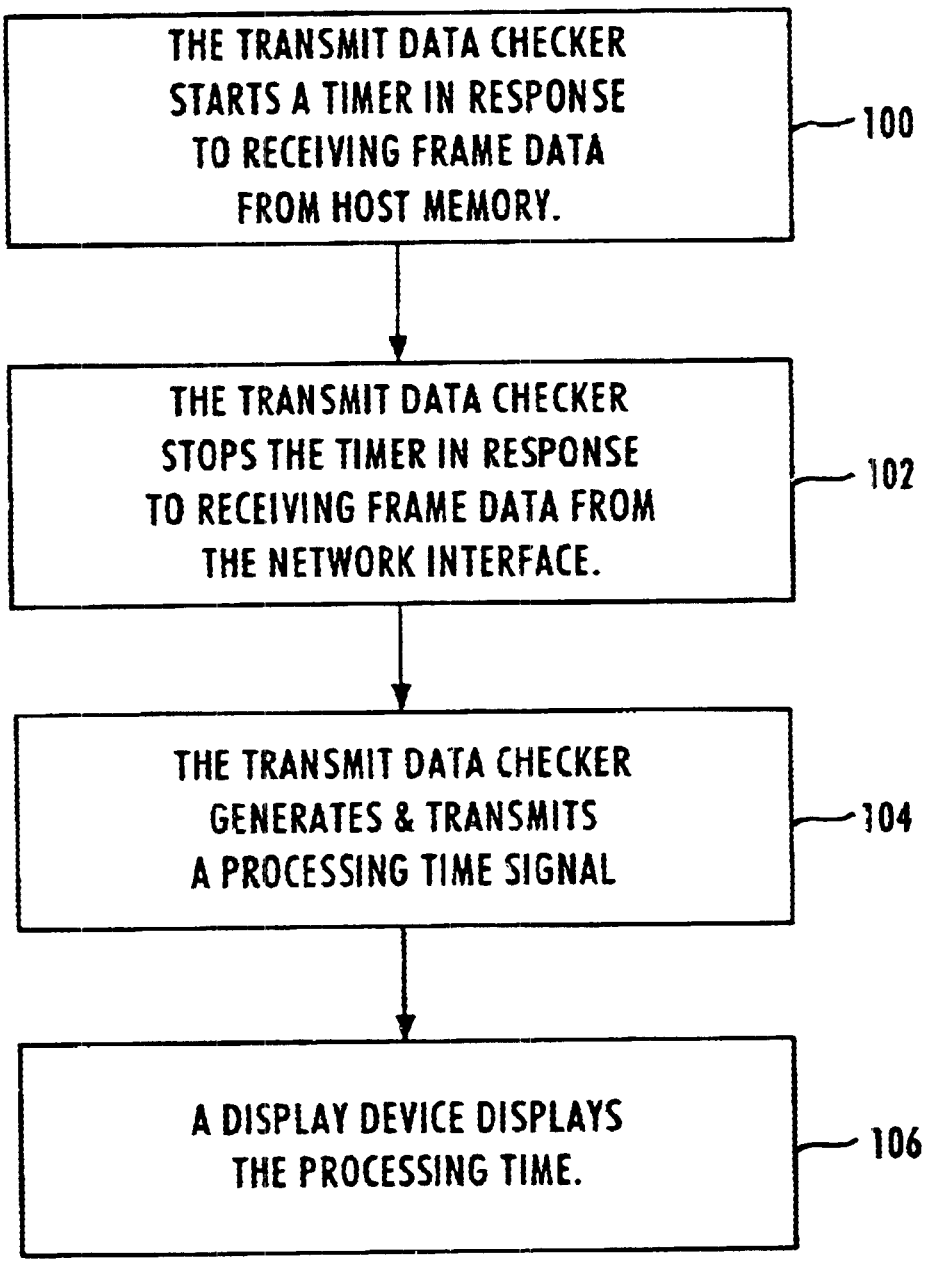
FIG. 5 is a flow chart of a method for determining the processing time of a network interface.

FIG. 5 is a flow chart of a method for determining the processing time of a network interface. The transmit data checker 64 starts a timer 70 in response to receiving frame data from host memory 62 at step 100. The transmit data checker 64 stops the timer 70 in response to receiving the frame data from the network interface 10 at step 102. The transmit data checker 64 generates and transmits a processing time signal in response to receiving the transmitted frame data from the network interface 10 at step 104. The processing time signal represents the processing time of the network interface. The display device 68 displays the processing time in response to receiving the processing time signal at step 106.

The use of a transmit data checker that receives frame data from directly from a host memory for comparison to processed frame data from the network interface advantageously avoids problems associated with cycle shifts and response time differences associated with prior art systems. Also, a more universal checking can be performed on the network interface outside of the confines imposed by a golden file. In addition, the transmit data checker is able to determine the processing time for the network interface.

While this invention has been described in connection with what is presently considered to be the most practical and preferred embodiments, it is to be understood that the invention is not limited to the disclosed embodiments, but, on the contrary, is intended to cover various modifications and equivalent arrangements included within the scope of the appended claims.

We claim:

1. A transmit data checker system comprising:
   a network interface configured for processing and transmitting frame data from a host memory; and
   a transmit data checker coupled separately to the host memory and the network interface and configured for determining if the network interface is transmitting processed frame data properly by comparing frame data stored in the host memory with the frame data transmitted by the network interface.

2. The transmit data checker system of claim 1, further comprising a network media for receiving the transmitted frame data from the network interface.

3. The transmit data checker system of claim 2, wherein the network media is either a network or a network model.

4. The transmit data checker system of claim 1, wherein the transmit data checker further comprises transmit data checker memory configured for storing the transmitted frame data from the network interface.

5. The transmit data checker system of claim 4, wherein the transmit data checker is configured to compare the frame data in the transmit data checker memory to the frame data stored in the host memory.

6. The transmit data checker system of claim 1, wherein the transmit data checker is further configured to generate and transmit an indicator signal indicating if the network interface is transmitting frame data properly.

7. The transmit data checker system of claim 6, further comprising a display device coupled to the transmit data checker for displaying the result of the comparison in response to receiving the indicator signal.

8. The transmit data checker system of claim 1, wherein the transmit data checker further comprises a timer for determining the processing time of the network interface.

9. The transmit data checker system of claim 8, further comprising a display device for displaying the processing time of the network interface in response to receiving a processing time signal from the transmit data checker, wherein the processing time signal indicates the processing time of the network interface.

10. A method for determining whether a network interface is transmitting frame data properly, comprising:
    receiving frame data directly from a host memory;

receiving transmitted frame data from a network interface;

comparing the transmitted frame data from the network interface to the frame data from the host memory; and determining if the network interface is transmitting frame data properly based on the result of the comparison.

11. The method of claim 10, further comprising generating an indicator signal indicating the result of the comparison of the transmitted frame data from the network interface and the frame data from the host memory.

12. The method of claim 11, further comprising displaying the result of the comparison in response to the indicator signal.

13. The method of claim 10, further comprising:

storing the transmitted frame data from the network interface;

comparing the stored frame data to the frame data from the host memory;

determining if the network interface is transmitting frame data properly; and generating an indicator signal indicating the result of the comparison of the stored frame data and the frame data from the host memory.

14. The method of claim 13, further comprising displaying the result of the comparison in response to the indicator signal.

15. The method of claim 10, further comprising determining the processing time of the network interface.

16. The method of claim 15, wherein determining the processing time of the network interface further comprises starting a timer in response to receiving the frame data from the host memory and stopping the timer in response to receiving the transmitted frame data from the network interface.

17. The method of claim 15, further comprising displaying the processing time of the network interface.

18. The method of claim 10, further comprising transmitting the frame data to a network media.

* * * * *